United States Patent [19]
Kouno et al.

[11] Patent Number: 6,022,945
[45] Date of Patent: Feb. 8, 2000

[54] PROCESS FOR PRODUCTION OF PROPYLENE OXIDE/ETHYLENE OXIDE BLOCK COPOLYMERS

[75] Inventors: Masahiro Kouno, Kanagawa-ken; Tadahito Nobori; Kazumi Mizutani, both of Yokohama; Usaji Takaki, Fujisawa, all of Japan

[73] Assignee: Mitsui Chemicals, Inc., Japan

[21] Appl. No.: 09/321,793

[22] Filed: May 28, 1999

Related U.S. Application Data

[62] Division of application No. 08/708,114, Sep. 4, 1996, Pat. No. 5,952,457.

[30] Foreign Application Priority Data

| | | | |
|---|---|---|---|
| Sep. 12, 1995 | [JP] | Japan | 7-234169 |
| Mar. 6, 1996 | [JP] | Japan | 6-048985 |
| May 23, 1996 | [JP] | Japan | 6-128664 |

[51] Int. Cl.$^7$ .......................... C08G 65/10; C07C 43/11
[52] U.S. Cl. ............................ 528/408; 568/620
[58] Field of Search .............................. 528/408; 568/620

[56] References Cited

U.S. PATENT DOCUMENTS 3,829,505  8/1974  Herold .

FOREIGN PATENT DOCUMENTS

| | | |
|---|---|---|
| 50-159595 | 12/1975 | Japan . |
| 56-38323 | 4/1981 | Japan . |
| 57-12026 | 1/1982 | Japan . |
| 62-232433 | 10/1987 | Japan . |
| 2-276821 | 11/1990 | Japan . |
| 48-93697 | 12/1993 | Japan . |
| 1115558 | 5/1968 | United Kingdom . |
| WO95/16725 | 6/1995 | WIPO . |

OTHER PUBLICATIONS

Martin Möller et al, "Anionic Polymerization of Oxirane in the Presence of the Polyiminophosphazene Base t–Bu–$P_4$", Macromol. Rapid Commun., 17,143 (1996).

Martin Möller et al, "Polymerization of Ethylene Oxide with Alkyllithium Compounds and the Phosphazene Base t–Bu–$P_4$", Angew. Chem. Int. Ed. Engl., 35, 623, (1996).

Martin Möller et al, "Use of Polyiminophosphazene Bases for Ring–Opening Polymerizations", Macromol. Symp., 107, 331 (1996).

Tang J. et al, *J. Am. Chem. Soc.*, "Synthesis of New Exceedingly Strong Non–ionic Bases", vol. 115, 1993, pp. 5015–5020, XP002022367.

Schwesinger R. et al, *Angew Chem. Int. Ed. Engl.*, "Peralkylated Polyaminophoshazenes", vol. 26, No. 11, 1987, pp. 1167–1169, XP002022574.

Esswein B. et al, *Chemical Abstracts*, "Use of Polyiminophosphazene Bases for Ring–opening Polymerisations", vol. 125, No. 02, 1996, pp. 331–340, XP002022368 *abstract* & Macromolekular Sympos., No. 17, 1996, pp. 331–340.

*Primary Examiner*—Donald R. Wilson
*Attorney, Agent, or Firm*—Burns, Doane, Swecker & Mathis, L.L.P.

[57] ABSTRACT

A catalyst for the polymerization of an alkylene oxide compound is disclosed. This catalyst is composed of a phosphazene compound or a phosphazenium salt which is derived from the phosphazene compound and an active hydrogen compound. A poly(alkylene oxide) can be efficiently produced by polymerizing the alkylene oxide compound in the presence of the catalyst and, when the catalyst is composed of the phosphazene compound, the active hydrogen compound. The poly(alkylene oxide) contains no metal component and compared with those produced using conventional amine-base catalysts, has also been improved significantly in odor.

1 Claim, No Drawings

PROCESS FOR PRODUCTION OF PROPYLENE OXIDE/ETHYLENE OXIDE BLOCK COPOLYMERS

This application is a divisional of application Ser. No. 08/708,114, filed Sep. 4, 1996, now U.S. Pat. No. 5,952,457.

BACKGROUND OF THE INVENTION

1. Field of the Invention

This invention relates to a catalyst useful upon polymerization of an alkylene oxide compound. The present invention is also concerned with a process for producing a poly(alkylene oxide) by polymerizing an alkylene oxide in the presence of an active hydrogen compound and a phosphazene compound or in the presence of a phosphazenium salt of the active hydrogen compound, said phosphazenium salt being derived from the active hydrogen compound and the phosphazene compound. A poly(alkylene oxide) is an important polymer for its utility as a raw material for the production of polyurethane foams and elastomers through its reaction with organopolyisocyanate compounds and also as a surfactant.

2. Description of the Related Art

As practical catalysts for use in the production of a poly(alkylene oxide), basic alkali metal compounds such as potassium hydroxide have found wide-spread utility, for example. Concerning catalysts other than such catalyst, U.S. Pat. No. 3,829,505 discloses obtaining a polymer from propylene oxide in the presence of an initiator while using, for example, a compound represented by $Zn_3[Fe(CN)_6]_2 \cdot H_2O \cdot dioxane$ as a catalyst. Japanese Patent Laid-Open No. 276821/1990 discloses to obtaining a polymer by reacting sodium methylate with a polyol, which has been prepared using zinc hexacyanocobaltate as a catalyst, and polymerizing ethylene oxide in the presence of the reaction product. Further, Japanese Patent Laid-Open No. 232433/1987 discloses obtaining a polymer by polymerizing ethylene oxide while using a reaction product which has been obtained by adding a solution of diethyl zinc in hexane to a dispersion formed by adding 1,4-butanediol and a nonionic surfactant to a slurry of fumed silica in hexane.

It is however known that, when a poly(alkylene oxide) is produced using a metal-containing catalyst such as those described above, a residue of the metal catalyst adversely affects the reaction upon production of polyurethane or physical properties of the resulting polyurethane. A special process or complex steps are therefore needed for the full elimination of such a metal residue upon production of a poly(alkylene oxide)

Concerning metal-free catalysts, on the other hand, Japanese Patent Laid-Open No. 159595/1975 discloses the preparation of a polymer from ethylene oxide while using an ether adduct of boron trifluoride in the presence of an alkanepolyol. This catalyst is however also known to require extremely complex steps for the thorough elimination of its residue and moreover, a particular impurity in the polymer gives deleterious effects on certain physical properties of urethane. Further, according to Japanese Patent Laid-Open No. 12026/1982, a polymer of an alkylene oxide is obtained in the presence of an alcohol while using aminophenol or the like as a catalyst. According to Japanese Patent Laid-Open No. 38323/1981, on the other hand, propylene oxide is polymerized in the presence of sorbitol as an initiator and tetramethylammonium hydroxide as a catalyst. These processes are however accompanied by problems such that the catalysts do not have sufficient polymerization activities and an amine-like odor remains in the resulting polymers.

SUMMARY OF THE INVENTION

An object of the present invention is therefore to provide a catalyst system, which acts efficiently upon production of a poly(alkylene oxide) by polymerizing an alkylene oxide compound and does not cause an odor to remain in the poly(alkylene oxide), and also a process for producing a poly(alkylene oxide) by using the catalyst system.

To achieve the above-described object, the present inventors have proceeded with an extensive investigation. As a result, it has been found extremely effective to produce a poly(alkylene oxide) by polymerizing an alkylene oxide compound in the presence of an active hydrogen compound and a metal-free phosphazene compound or in the presence of a phosphazenium salt of the active hydrogen compound, said phosphazenium salt having been derived from the active hydrogen compound and the phosphazene compound, leading to the completion of the present invention.

In one aspect of the present invention, there is thus provided a process for the production of a poly(alkylene oxide), which comprises reacting an alkylene oxide (compound) in the presence of an active hydrogen compound and a phosphazene compound represented by the following partial structural formula (1):

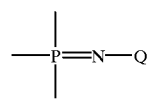

(1)

wherein Q represents a hydrocarbon group having 1 to 20 carbon atoms, or in the presence of a phosphazenium salt of said active hydrogen compound, said phosphazenium salt having been derived from said active hydrogen compound and said phosphazene compound and being represented by the following partial structural formula (2):

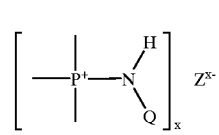

(2)

wherein Q represents a hydrocarbon group having 1 to 20 carbon atoms, x re presents a number of phosphazenium cations, and $Z^{x-}$ represents an x-valent anion of said active hydrogen compound.

In another aspect of the present invention, there is also provided a poly(alkylene oxide) which is obtainable by polymerizing an alkylene oxide compound in the presence of an active hydrogen compound and a phosphazene compound represented by the partial structural formula (1) or in the presence of a phosphazenium salt of the active hydrogen compound, said phosphazenium salt being represented by the partial structural formula (2) and having been derived from the active hydrogen compound and the phosphazene compound.

In a further aspect of the present invention, there is also provided a catalyst useful for the production of a poly (alkylene oxide) by polymerization of an alkylene oxide compound, which comprises a phosphazene compound represented by the partial structural formula (1).

In a still further aspect of the present invention, there is also provided a catalyst useful for the production of a poly(alkylene oxide) by polymerization of an alkylene oxide compound, which comprises a phosphazenium salt of an active hydrogen compound, said phosphazenium salt being represented by the partial structural formula (2).

DETAILED DESCRIPTION OF THE INVENTION

The term "active hydrogen compound" as used in the process according to the present invention means a compound containing active hydrogen, illustrative of which are water; saturated or unsaturated, monohydric alcohol having 1 to 20 carbon atoms, such as methanol, hexanol and allyl alcohol; polyhydric alcohols having 2 to 10 hydroxyl groups and 2 to 20 carbon atoms, such as ethylene glycol, propylene glycol, dipropylene glycol, trimethylolpropane, glycerin, diglycerin, triglycerin, pentaerythritol, dipentaerythritol, tripentaerythritol, 1,4-butanediol, 2-butene-1,4-diol, 2-butyn-1,4-diol, 1,6-hexanediol and 1,4-cyclohexanediol; aromatic compound having 1 to 2 hydroxyl groups and 6 to 20 carbon atoms, such as phenol, nonylphenol, 2-naphthol, 2,6-dihydroxynaphthalene, bisphenol F and bisphenol A; carboxylic acids having 1 to 6 carbon atoms, such as formic acid, acetic acid, propionic acid, butyric acid, isobutyric acid and caproic acid; saccharides and derivatives thereof, such as sorbitol, dextrose and sucrose; aliphatic amine compounds having one or more primary or secondary amino groups, such as N-hexylamine, ethylenediamine, N,N'-dimethylethylenediamine and hexamethylenediamine; aromatic amine compounds having one or more primary or secondary amino groups, such as aniline, 2,4-diaminotoluene, 2,6-diaminotoluene, N-methylaniline, 4,4'-diaminodiphenylmethane and 1,3-diaminobenzene; alkanolamines having a hydroxyl group and an amino group, such as ethanolamine, diethanolamine and triethanolamine; and oligo(alkylene oxide)s and poly(alkylene oxide)s, which are obtained by polymerizing alkylene oxides while using these active hydrogen compounds described above as initiators.

Of these, preferred are water, saturated or un-saturated, monohydric alcohols having 1 to 20 carbon atoms, polyhydric alcohols having 2 to 10 hydroxyl groups and 2 to 20 carbon atoms, aromatic compounds having 1 to 2 hydroxyl groups and 6 to 20 carbon atoms, carboxylic acids having 1 to 6 carbon atoms, saccharides and derivatives thereof, oligoalkylene oxides, and poly(alkylene oxide)s. More preferred are water; methanol; ethanol; phenol; 1-naphthol; acetic acid; propionic acid; ethylene glycol; propylene glycol; glycerin; pentaerythritol; sorbitol; dextrose; sucrose; and poly(ethylene glycol), poly(propylene glycol) and copolymers thereof, whose molecular weights range from 90 to 10,000. If necessary, two or more of these active hydrogen compounds may be used in combination without any inconvenience.

Illustrative of the alkylene oxide compound in the process of the present invention are epoxy compounds such as ethylene oxide, propylene oxide, 1,2-butylene oxide, 2,3-butylene oxide, styrene oxide, cyclohexene oxide, epichlorohydrin, epibromohydrin, methyl glycidyl ether, allyl glycidyl ether and phenyl glycidyl ether. Two or more of these alkylene oxide compounds may be used in combination. When employed in combination, it is possible to use the plural alkylene oxide compounds concurrently, successively or alternately.

Of these alkylene oxide compounds, ethylene oxide, propylene oxide, 1,2-butylene oxide and styrene oxide are preferred.

The term "phosphazene compound" as used herein means a compound represented by the following partial structural formula (1):

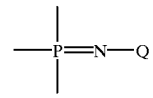

(1)

wherein Q represents a hydrocarbon group having 1 to 20 carbon atoms; preferably a compound represented by the following chemical formula (3):

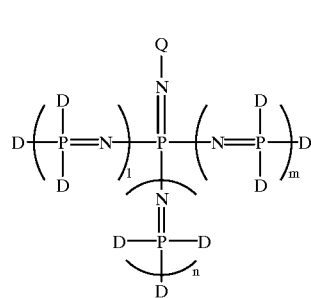

(3)

wherein l, m and n individually represent 0 or a positive integer of 3 or smaller, Ds may be the same or different and individually represent a hydrocarbon group having 1 to 20 carbon atoms, an alkoxy group, a phenoxy group, a thiol residual group, a thiophenol residual group, a mono-substituted amino group, a di-substituted amino group or a 5- or 6-membered cyclic amino group, Q represents a hydrocarbon group having 1 to 20 carbon atoms, and two Ds on the same phosphorus atom or different phosphorus atoms may be linked together or D and Q may be linked together to form a ring structure.

On the other hand, the term "phosphazenium salt of the active hydrogen compound" as used herein, said phosphazenium salt being derived from the active hydrogen compound and the phosphazene compound, means a salt represented by the following partial structural formula (2):

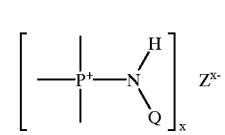

(2)

wherein Q represents a hydrocarbon group having 1 to 20 carbon atoms, x represents a number of phosphazenium cations, and $Z^{x-}$ represents an x-valent anion of said active hydrogen compound; preferably a salt represented by the following chemical formula (4):

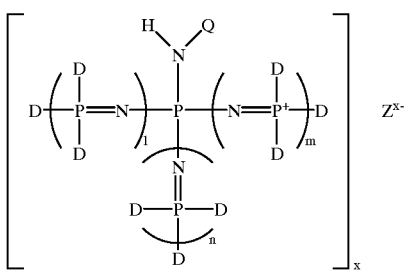

(4)

wherein l, m and n individually represent 0 or a positive integer of 3 or smaller, Ds may be the same or different and individually represent a hydrocarbon group having 1 to 20 carbon atoms, an alkoxy group, a phenoxy group, a thiol residual group, a thiophenol residual group, a mono-substituted amino group, a di-substituted amino group or a 5- or 6-membered cyclic amino group, Q represents a hydrocarbon group having 1 to 20 carbon atoms, two Ds on the same phosphorus atom or different phosphorus atoms may be linked together or D and Q may be linked together to form a ring structure, x represents a number of phosphazenium cations, and $Z^{x-}$ represents an x-valent anion of said active hydrogen compound.

It is well known that, as a phosphazene compound has strong basicity, it easily extracts a proton from an active hydrogen compound to form a phosphazenium salt of the active hydrogen compound. Further, the above-described active hydrogen compounds include compounds containing plural active hydrogen atoms in their molecules. Although such active hydrogen compounds may form phosphazenium salts by entirely giving off their active hydrogen atoms, they may also partly give off their active hydrogen atoms to form salts. The letter x which indicates the valence number varies depending on the active hydrogen compound and cannot be defined in any wholesale manner, but generally ranges from 1 to 10, with 1 being preferred.

Qs in the partial structural formula (1), partial structural formula (2), chemical formula (3) and chemical formula (4) and Ds in the chemical formula (3) and chemical formula (4) may contain any substituent group or groups provided that such substituent group or groups will not interfere with the polymerization reaction.

Examples of the hydrocarbon group having 1 to 20 carbon atoms as D include alkyl groups such as methyl, ethyl, propyl, isopropyl, n-butyl, isobutyl, sec-butyl, tert-butyl, pentyl, neopentyl, hexyl, heptyl, octyl, tert-octyl, nonyl and decyl; alkyl groups containing one or more unsaturated bonds or aromatic groups, such as allyl, 2-methylallyl, benzyl, phenethyl, o-anisyl, 1-phenylethyl, diphenylmethyl, triphenylmethyl and cinnamyl; alicyclic groups such as cyclopentyl, cyclohexyl, 4-methylcyclohexyl, 3-propylcyclohexyl, 4-phenylcyclohexyl, cycloheptyl and 1-cyclohexenyl; alkenyl groups such as vinyl, styryl, propenyl, isopropenyl, 2-methyl-1-propenyl and 1,3-butadienyl; alkynyl groups such as ethynyl and 2-propynyl; and aromatic groups such as phenyl, o-tolyl, m-tolyl, p-tolyl, 2,3-xylyl, 2,4-xylyl, 3,4-xylyl, mesityl, o-cumenyl, m-cumenyl, p-cumenyl, 1-naphthyl, 2-naphthyl and p-methoxyphenyl.

Examples of the alkoxy group as D include alkoxy groups containing 1 to 20 carbon atoms, such as methoxy, ethoxy, propoxy, isopropoxy, butoxy, pentyloxy, allyloxy, cyclohexyloxy and benzyloxy. Examples of the phenoxy group as D include phenoxy groups having 6 to 20 carbon atoms, such as phenoxy, 4-methylphenoxy, 3-propylphenoxy and 1-naphthyloxy. Examples of the thiol residual group as D include thiol residual groups having 1 to 20 carbon atoms, such as methylthio, ethylthio, propylthio, isopropylthio, butylthio, isobutylthio, tert-butylthio, pentylthio, hexylthio, heptylthio, octylthio, tert-octylthio, nonylthio and decylthio. Examples of the thiophenol residual group include thiophenol residual groups having 6 to 20 carbon atoms, such as phenylthio, o-tolylthio, m-tolylthio, p-tolylthio, 2,3-xylylthio, 2,4-xylylthio, 3,4-xylylthio, 4-ethylphenylthio and 2-naphthylthio. Examples of the mono-substituted amino group as D include mono-substituted amino groups having 1 to 20 carbon atoms, such as methylamino, ethylamino, propylamino, isopropylamino, butylamino, isobutylamino, tert-butylamino, pentylamino, hexylamino, heptylamino, octylamino, tert-octylamino, nonylamino, decylamino, 1-ethylpropylamino, 1-ethylbutylamino, anilino, o-tolyl-amino, m-tolylamino, p-tolylamino, 2,3-xylylamino, 2,4-xylylamino and 3,4-xylylamino. Examples of the di-substituted amino group as D include amino groups di-substituted by hydrocarbon groups which may be the same or different and individually have 1 to 20 carbon atoms, such as dimethylamino, diethylamino, methylethylamino, dipropylamino, methylpropylamino, diisopropylamino, dibutylamino, methylbutylamino, diisobutylamino, di-sec-butylamino, dipentylamino, dihexylamino, ethylhexylamino, diheptylamino, dioctylamino, di-tert-octylamino, ethyl-tert-octylamino, dinonylamino, didecylamino, diphenylamino, methylphenylamino, ethylphenylamino, di-o-tolylamino, di-2,3-xylylamino and phenyltolylamino; and 5- or 6-membered cyclic amino groups such as 1-pyrrolidinyl, 3-methyl-1-pyrrolidinyl, 1-pyrrolyl, 3-ethyl-l-pyrrolyl, 1-indolyl, 1-piperidyl, 3-methyl-l-piperidyl, 1-piperazinyl, 4-methyl-1-piperazinyl, 1-imidazolidinyl and 4-morpholinyl.

Specific examples of Q are the same as those exemplified as the hydrocarbon group D.

Examples of the divalent group (D—D) on the same phosphorus atom or different phosphorus atoms when the two Ds on the same phosphorus atom or different phosphorus atoms are linked together to form a ring structure wholly or partly include saturated or unsaturated divalent aliphatic hydrocarbon groups such as ethylene, vinylene, propylene, 1,2-cyclohexanylene, 1,2-phenylene, trimethylene, propenylene, tetra-methylene, 2,2'-biphenylene, 1-butenylene, 2-butenylene and pentamethylene; and divalent groups in the form that desired one or two atoms are inserted between one or both ends of said divalent aliphatic hydrocarbon groups and their associated phosphorus atoms, said desired one or two atoms being selected from the group consisting of an oxygen atoms, a sulfur atom, and a nitrogen atom to which a hydrogen atom or an aliphatic or aromatic hydrocarbon group, such as methyl, ethyl, butyl, cyclohexyl, benzyl or phenyl group, is bonded. Specific examples of such divalent groups include methyleneoxy, ethylene-2-oxy, trimethylene-3-oxy, methylenedioxy, ethylenedioxy, trimethylene-1,3-dioxy, cyclohexane-1,2-dioxy, benzene-1,2-dioxy, methylenethio, ethylene-2-thio, trimethylene-3-thio, tetra-methylene-4-thio, methylenedithio, ethylenedithio, trimethylene-1,3-dithio, aminomethylene, aminoethylene, aminotrimethylene, aminotetramethylene, N-ethylaminomethylene, N-cyclohexylaminoethylene, N-methylaminotrimethylene, N-benzylaminotetramethylene, diaminomethylene, ethylenediamno, vinylenediamino, trimethylenediamino, N,N'-dimethylmethylenediamino, vinylenediamino, trimethylenediamino, N,N'-dimethylmethylenediamino, N,N'-diphenylethylenediamino, N,N'-dimethylethylenediamino, N-methyl-N'-ethyltrimethylenediamino, N,N'-diethyltetramethylenediamino and N-methyltrimethylenediamino.

Further, when D and Q are linked together to form a ring structure wholly or partly, the associated nitrogen atom and the associated phosphorus atom are connected to each other through a so-formed divalent group (D–Q). Illustratives of the divalent group (D–Q) are the same saturated or unsaturated aliphatic divalent hydrocarbon groups as those exemplified above as divalent groups on the two phosphorus atoms; and divalent groups with a desired atom inserted between the above divalent hydrocarbon groups and their associated phosphorus atoms, said desired atom being selected from the group consisting of an oxygen atom, a sulfur atom, and a nitrogen atom to which a hydrogen atom or an aliphatic or aromatic hydrocarbon group such as methyl, ethyl, butyl, cyclohexyl, benzyl or phenyl group is bonded. Specific examples of these divalent groups include groups such as methyleneoxy, ethylene-2-oxy, methylenethio, ethylene-2-thio, aminomethylene, aminoethylene, N-methylaminomethylene, N-ethylaminoethylene, N-methylaminotrimethylene and N-phenylaminoethylene.

Specific examples of the phosphazene compound having the structure represented by the chemical formula (3) or the phosphazene compound from which the salt of the chemical formula (4) is derived will hereinafter be described. Illustrative of cases where Ds are alkyl groups of the same kind or different kinds are 1-tert-butyl-2,2,2-trimethylphosphazene and 1-(1,1,3,3-tetrametylbutyl)-2,2,4,4,4-pentaisopropyl-$2\lambda^5,4\lambda^5$-catenadi(phosphazene). Illustrative of cases where each D is an alkyl group containing an un-saturated bond or aromatic group are 1-tert-butyl-2,2,2-triallylphosphazene, 1-cyclohexyl-2,2,4,4,4-pentaallyl- $2\lambda^5$, $4\lambda^5$-catenadi(phosphazene) and 1-ethyl-2,4,4,4-tribenzyl-2-tribenzylphosphoranilideneamino-$2\lambda^5,4\lambda^5$-catenadi (phosphazene). Illustrative of cases where each D is an alicyclic group are 1-methyl-2,2,2-tricyclopentylphosphazene and 1-propyl-2,2,4,4,4-cyclohexyl-$2\lambda^5,4\lambda^5$-catenadi(phosphazene). Illustrative of cases where each D is an alkenyl group are 1-butyl-2,2,2-trivinylphosphazene and 1-tert-butyl-2,2,4,4,4-pentastyryl-$2\lambda^5,4\lambda^5$-catenadi(phosphazene). Illustrative of cases where each D is an alkynyl group is 1-tert-butyl-2,2,2-tri(2-phenylethynyl)phosphazene. Illustrative of cases where each D is an aromatic group are 1-isopropyl-2,4,4,4-tetraphenyl-2-triphenylphosphoranilideneamino-$2\lambda^5,4\lambda^5$-catenadi(phosphazene).

Further, illustrative of cases where each D is an alkoxy group are l-tert-butyl-2,2,2-trimethoxyphosphazene, 1-(1,1,3,3-tetramethylbutyl)-2,2,4,4,4-pentaisopropoxy-$2\lambda^5,4\lambda^5$-catenadi(phosphazene) and 1-phenyl-2,2,4,4,4-pentabenzyloxy-$2\lambda^5,4\lambda^5$-catenadi(phosphazene). Illustrative of cases where each D is a phenoxy group are 1-methyl-2,2,2-triphenoxyphosphazene and 1-tertbutyl-2,2,4,4,4-penta(1-naphthyloxy)-$2\lambda^5,4\lambda^5$-catenadi (phosphazene).

Illustrative of cases where D is a thiol residual group are 1-tert-butyl-2,2,2-trimethylthiophosphazene and 1-methyl-2,4,4,4-tetraisopropylthio-2-triisopropylthiophosphoranilideneamino-$2\lambda^5,4\lambda^5$-catena-di (phosphazene). Illustrative of cases where each D is a thiophenol residual group is l-allyl-4,4,4-triphenyl-thio-2,2-bis(triphenylthiophosphoranilideneamino)-$2\lambda^5,4\lambda^5$-catenadi(phosphazene).

Illustrative of cases where each D is a mono-substituted amino group are 1-tert-butyl-2,2,2-tri(methylamino) phosphazene, 1-(1,1,3,3-tetramethylbutyl)-2,2,4,4,4-penta (isopropylamino)-$2\lambda^5,4\lambda^5$-catenadi(phosphazene), 1-tert-butyl-2,4,4,4-tetra(methylamino)-2-tri(methylamino) phosphoranilideneamino-$2\lambda^5,4\lambda^5$-catenadi(phosphazene), 1-tert-butyl-2,4,4,4-tetra tetra(isopropylamino)-2-tri (isopropylamino)phosphoranilideneamino-$2\lambda^5,4\lambda^5$-catenadi (phosphazene), 1-tert-butyl-2,4,4,4-tetra(tert-butylamino)-2-tri(tert-butylamino) phosphoranilideneamino-$2\lambda^5,4\lambda^5$-catenadi (phosphazene), 1-tert-butyl-2,4,4,4-tetra (allylamino)-2-tri (allylamino) phosphoranilideneamino-$2\lambda^5,4\lambda^5$-catenadi(phosphazene), 1-tert-butyl-4,4,4-tri (methylamino)-2,2-bis[tri(methylamino) phosphoranilideneamino]-$2\lambda^5$, $4\lambda^5$-catenadi(phosphazene), 1-tert-butyl-4,4,4-tri(isopropylamino)-2,2-bis[tri (isopropylamino)-phosphoranilideneamino]-$2\lambda^5,4\lambda^5$-catenadi(phosphazene), 1-tert-butyl-4,4,4-tri(tert-butylamino)-2,2 -bis[tri-(tert-butylamino) phosphoranilideneamino]-$2\lambda^5,4\lambda^5$-catenadi(phosphazene), 1-tert-butyl-4,4,6,6,6-penta(methylamino)-2,2-bis[tri (methylamino)phosphoranilideneamino]-$2\lambda^5,4\lambda^5$-catenatri (phosphazene), 1-tert-butyl-4,4,6,6,6-penta (isopropylamino)-2,2-bis[tri-(isopropylamino) phosphoranilideneamino]-$2\lambda^5,4\lambda^5$, $6\lambda^5$-catenatri (phosphazene), 1-tert-butyl-4,4,6,6,6-penta-(tert-butylamino)-2,2-bis[tri(tert-butylamino) phosphoranilideneamino]-$2\lambda^5,4\lambda^5,6\lambda^5$-catenatri (phosphazene) and 1-tert-butyl-4,4,6,6,6-penta (methylamino)-2-[2,2,2-tri-(methylamino)phosphazen-1-yl]-2-[2,2,4,4,4-penta-(methylamino) -$2\lambda^5,4\lambda^5$-catenadi (phosphazen)-1-yl]-$2\lambda^5,4\lambda^5,6\lambda^5$-catenatri(phosphazene).

Illustrative of cases where each D is a di-substituted amino group are 1-tert-butyl-2,2,2-tris-(dimethylamino) phosphazene, 1-(1,1,3,3-tetramethylbutyl)-2,2,2-tris (dimethylamino)phosphazene, 1-ethyl-2,2,4,4,4-pentakis (dimethylamino)-$2\lambda^5,4\lambda^5$-catenadi(phosphazene), 1-tert-butyl-2,4,4,4-tetrakis-(dimethylamino)-2-tris (dimethylamino)phosphoranilideneamino-$2\lambda^5,4\lambda^5$-catenadi (phosphazene), 1-tert-butyl-2,4, 4, 4-tetrakis (diisopropylamino)-2-tris(diisopropylamino) phosphoranilideneamino-$2\lambda^5,4\lambda^5$-catenadi(phosphazene), 1-tert-butyl-2,4,4,4-tetrakis(di-n-butylamino)-2-tris(di-n-butylamino)phosphoranilidene-amino-$2\lambda^5,4\lambda^5$-catenadi (phosphazene, 1-tert-butyl-4,4, 4-tris (dimethylamino)-2,2-bis [tris (dimethylamino)-phosphoranilideneamino]-$2\lambda^5$, $4\lambda^5$-catenadi (phosphazene), 1-(1,1,3,3-tetramethylbutyl)-4,4,4-tris(dimethylamino)-2,2-bis[tris(dimethylamino) phosphranilideneamino]-$2\lambda^5,4\lambda^5$-catenadi(phosphazene), 1-(1,1,3,3-tetramethylbutyl)-4,4,4-tris(methylethylamino)-2,2-bis[tris(methylethylamino)phosphoranilideneamino]-$2\lambda^5,4\lambda^5$-catenadi(phosphazene), 1-tert-butyl-4,4,4-tris (diethylamino)-2,2-bis[tris(diethylamino) phosphoranilideneamino]-$2\lambda^5,4\lambda^5$-catenadi(phosphazene), 1-tert-butyl-4,4,4-tris(diisopropylamino)-2,2-bis[tris (diisopropylamino)phosphoranilideneamino]-$2\lambda^5,4\lambda^5$-catenadi(phosphazene), 1-tert-butyl-4,4,4-tris(di-n-butylamino)-2,2-bis[tris(di-n-butylamino) phosphoranilideneamino]-$2\lambda^5,4\lambda^5,6\lambda^5$-catenadi (phosphazene), 1-tert-butyl-4,4,6,6,6-pentakis (dimethylamino)-2,2-bis[tris(dimethylamino) phosphoranilideneamino]-$2\lambda^5,4\lambda^5,6\lambda^5$-catenatri (phosphazene), 1-tert-butyl-4,4,6,6,6-pentakis (diethylamino)-2,2-bis[tris(diethylamino) phosphoranilideneamino]-$2\lambda^5,4\lambda^5,6\lambda^5$-catenatri (phosphazene), 1-tert-butyl-4,4,6,6,6-pentakis (diisopropylamino)-2,2-bis[tris(diisopropylamino)

phosphoranilideneamino]-2$\lambda^5$,4$\lambda^5$,6$\lambda^5$-catenatri (phosphazene), 1-tert-butyl-4,4,6,6,6-pentakis(di-n-butylamino)-2,2-bis[tris(di-n-butylamino) phosphoranilideneamino]- 2$\lambda^5$,4$\lambda^5$,6$\lambda^5$-catenatri (phosphazene), 1-tert-butyl-4,4,6,6,6-pentakis (dimethylamino)-2-[2,2,2-tris(dimethylamino)-phosphazen-1-yl]-2-[2,2,4,4,4-pentakis(dimethylamino)-2$\lambda^5$,4$\lambda^5$-catenadi(phosphazen)-1-yl]-2$\lambda^5$,4$\lambda^5$,6$\lambda^5$-catenatri (phosphazene) and 1-phenyl-2,2-bis(dimethylamino)-4, 4-dimethoxy-4-phenylamino-2$\lambda^5$,4$\lambda^5$-catenadi (phosphazene).

Illustrative of cases where each D is a 5- or 6- membered cyclic amino group are 1-tert-butyl-2,2,2-tri(1-pyrrolidinyl) phosphazene, 1-tert-butyl-2,2,4,4,4-penta(1-pyrrolidinyl)-2$\lambda^5$,4$\lambda^5$-catenadi(phosphazene), 1-tert-butyl-2,2,4,4,4-penta (4-morpholinyl)-2$\lambda^5$,4$\lambda^5$-catenadi(phosphazene), 1-tert-butyl-2,2,4,4,4-penta(1-piperidinyl)-2$\lambda^5$,4$\lambda^5$-catenadi (phosphazene), 1-tert-butyl-2,2,4,4,4-penta (4-methyl-1-piperidinyl)-2$\lambda^5$,4$\lambda^5$-catenadi(phosphazene), 1-tert-butyl-2, 2,4,4,4-penta(1-imidazolyl)-2$\lambda^5$,4$\lambda^5$-catenadi (phosphazene), 1-tert-butyl-2,4,4,4-tetra(1-pyrrolidinyl)-2-tri(1-pyrrolidinyl) phosphoranilideneamino-2$\lambda^5$,4$\lambda^5$-catenadi(phosphazene), 1-tert-butyl-2,4,4,4-tetra(1-piperidinyl)-2-tri(1-piperidinyl)phosphoranilidene-amino-2$\lambda^5$,4$\lambda^5$-catenadi(phosphazene), 1-tert-butyl-2,4,4,4-tetra(4-morpholinyl)-2-tri(4-morpholinyl)-phosphoranilideneamino-2$\lambda^5$,4$\lambda^5$-catenadi (phosphazene) 1-tert-butyl-2,4,4,4-tetra(4-methyl-1-piperazinyl)-2-tri(4-methyl-1-piperazinyl)phosphoranilideneamino-2$\lambda^5$,4$\lambda^5$, 6$\lambda^5$-catenadi(phosphazene), 1-tert-butyl-2,4,4,4-tetra(1-imidazolyl)-2-tri(1-imidazolyl)phosphoranilideneamino-2$\lambda^5$,4$\lambda^5$-catenadi(phosphazene), 1-tert-butyl-4,4,4-tri(1-pyrrolidinyl)-2,2-bis[tri(1-pyrrolidinyl) phosphoranilideneamino]-2$\lambda^5$,4$\lambda^5$-catenadi(phosphazene), 1-tert-butyl-4,4,4-tri(4-morpholinyl)-2,2-bis[tri(4-morpholinyl)phosphoranilideneamino]-2$\lambda^5$,4$\lambda^5$-catenadi (phosphazene), 1-tert-butyl-4,4,4-tri(1-piperidinyl)-2,2-bis [tri(1-piperidinyl)phosphoranilideneamino]-2$\lambda^5$,4$\lambda^5$-catena-di(phosphazene), 1-tert-butyl-4,4,4-tri(4-methyl-1-piperazinyl)-2,2-bis[tri(4-methyl-1-piperazinyl)-phosphoranilideneamino]-2$\lambda^5$,4$\lambda^5$-catenadi(phosphazene), 1-tert-butyl-4,4,4-tri(1-imidazolyl)-2,2-bis[tri(1-imidazolyl) phosphoranilideneamino]-2$\lambda^5$,4$\lambda^5$-catenadi(phosphazene), 1-tert-butyl-4,4,6,6,6-penta(1-pyrrolidinyl)-2,2-bis[tri(1-pyrrolidinyl)phosphoranilideneamino]-2$\lambda^5$,4$\lambda^5$,6$\lambda^5$-catenatri(phosphazene), 1-tert-butyl-4,4,6,6,6-penta(1-piperidinyl)-2,2-bis[tri(1-piperidinyl) phosphoranilideneamino]-2$\lambda^5$,4$\lambda^5$,6$\lambda^5$-catenatri (phosphazene), 1-tert-butyl-4,4,6,6,6-penta(4-morpholinyl)-2,2-bis[tri(4-morpholinyl)phosphoranilideneamino]-2$\lambda^5$, 4$\lambda^5$,6$\lambda^5$-cantenatri(phosphazene), 1-tert-butyl-4,4,6,6,6-penta(4-methyl-1-piperazinyl)-2,2-bis[tri(4-methyl-1-piperazinyl) phosphoranilideneamino]-2$\lambda^5$,4$\lambda^5$,6$\lambda^5$-catenatri(phosphazene) and 1-tert-butyl-4,4,6,6,6-penta(1-pyrrolidinyl)-2-[2,2,4,4,4-penta(1-pyrrolidinyl)-2$\lambda^5$,4$\lambda^5$-catenadi(phosphazen)-1-yl]-2-[2,2,2-tri(1-pyrrolidinyl) phosphazen-1-yl ]2$\lambda^5$,4$\lambda^5$,6$\lambda^5$-catenatri(phosphazene).

Further, illustrative of cases where two Ds on the same phosphorus atom or different phosphorus atoms are linked together to form a ring structure is 2-(tert-butylimino)-2-dimethylamino-1,3-dimethyl-1,3-diaza-2$\lambda^5$-phosphinane.

Illustrative of cases where D and Q are linked together to form a ring structure are 5,7,11-trimethyl-1,5,7,11-tetraaza-6$\lambda^5$-phosphaspiro[5.5]undeca-1(6)-ene, 7-ethyl-5, 11-dimethyl-1,5,7, 11-tetraaza-6A$^5$-phosphaspiro[5.5] undeca-1(6)-ene, 6,8,13-trimethyl-1,6,8,13-tetraaza-7$\lambda^5$-phosphaspiro[6.6]trideca-1(7)-ene, 7-methyl-1,7-diaza-5, 11-dioxa-6$\lambda^5$-phosphaspiro[5.5]-undeca-1(6)-ene, 7-methyl-1,7-diaza-5-oxa-11-thia-6$\lambda^5$-phosphaspiro[5.5] undeca-1(6)-ene, 1-tert-butylimino-1-dimethylamino-1,3-diphospha-2-aza-3,3-dimethyl-2-cyclohexene-6$\lambda^5$-phosphaspiro[5.5]undeca-1(6)-ene and 1-dimethylamino-1-(2-dimethylamino-2,2-trimethylenediaminophosphazen-1-yl)-1$\lambda^5$-phospha-2,6-diaza-1-cyclohexene.

Synthesis processes of these phosphazene compounds are described in detail inter alia in H. R. Allcock, Phosphorus-Nitrogen Compounds, Academic Press 1972, Reinhard Schwesinger, Nachr. Chem. Tec. Lab., 38(1990), Nr. 10, 1214–1226, and Reinhard Schwesinger, Chem. Ber., 1994, 127, 2435–2454. For example, 1-tert-butyl-2,2,2-triallylphosphazene can be readily synthesized by reacting triallylphosphine and tert-butyl azide in ethyl ether as disclosed on page 114 of the above reference book by H. R. Allcock. Further, 1-phenyl-2,2-bis(dimethylamino)-4,4-dimethoxy-4-phenylamino-2$\lambda^5$,4$\lambda^5$-catenadi(phosphazene) can be synthesized as disclosed on page 115 ibid., namely, by reacting bis(dimethylamino)chlorophosphine with phenyl azide and then with triethylammonium azide and further reacting the resultant 1-phenyl-2-azido-2,2-bis (dimethylamino)-phosphazene with dimethoxyphenylaminophosphine.

l, m and n in each of the compounds represented by the chemical formula (3) and the salts represented by the chemical formula (4) individually stand for 0 or a positive integer of 3 or smaller, with 0 or a positive integer of 2 or smaller being preferred. More preferably, l, m and n can, irrespective of the order thereof, be values of a combination selected from (2,1,1), (1,1,1), (1,1,0), (1,0,0) or (0,0,0).

Preferably, Ds in each of the phosphazene compound represented by the chemical formula (3) and the phosphazenium salt represented by the chemical formula (4) can be the same or different and can be selected from the group consisting of hydrocarbon groups having 1 to 20 carbon atoms, alkoxy groups having 1 to 20 carbon atoms, phenoxy groups having 6 to 20 carbon atoms, mono-substituted amino groups having 1 to 20 carbon atoms, amino groups di-substituted by hydrocarbon groups which have 1 to 20 carbon atoms and are the same or different, and 5- or 6-membered cyclic amino groups. Of these, more preferred Ds are substituent groups, which are the same or different and are each selected, for example, from amino groups di-substituted by alkyl groups which are the same or different and have 1 to 6 carbon atoms, such as dimethylamino, diethylamino, methylethylamino, dipropylamino, methylpropylamino, diisopropylamino, dibutylamino, methylbutylamino, diisobutylamino and di-sec-butylamino, and from 5- or 6-membered cyclic amino groups such as 1-pyrrolidinyl, 1-pyrrolyl, 1-piperidyl, 1-piperazinyl and 4-morpholinyl. Still more preferred Ds are di-substituted amino groups which are each selected from the group consisting of dimethylamino, methylethylamino and diethylamino groups.

On the other hand, each Q in each of the partial structural formula (1), partial structural formula (2), chemical formula (3) and chemical formula (4) may preferably be an alkyl group having 1 to 10 carbon atoms, such as methyl, ethyl, propyl, isopropyl, n-butyl, isobutyl, sec-butyl, tert-butyl, pentyl, neopentyl, hexyl, heptyl, octyl, tert-octyl, nonyl and decyl.

Further, preferred examples of the divalent group (D—D) on the same phosphorus atom or different phosphorus atoms when the two Ds on the same phosphorus atom or different phosphorus atoms in each of the chemical formula (3) and the chemical formula (4) are linked together to form a ring structure are divalent groups in each of which a methyl or ethyl group has been substituted on each of the two nitrogen atoms of an ethylenediamino, trimethylenediamino or tetramethylenediamino group.

Moreover, preferred examples of the divalent group (D–Q) connecting the associated nitrogen atom and the associated phosphorus atom when the D and Q are linked together to form a ring structure in each of the chemical formula (3) and the chemical formula (4) are divalent N-methyl or ethyl-a-aminoalkylene groups in each of which a methyl or ethyl group has been substituted on the nitrogen atom of an aminomethylene, aminoethylene or aminotrimethylene group.

Among these phosphazene compounds or these phosphazene compounds from which the phosphazenium salts of active hydrogen compounds are derived, the following phosphazene compounds can be mentioned as more preferred ones:

1-tert-butyl-2,2,2-tris(dimethylamino)phosphazene [chemical formula (5)] (5)

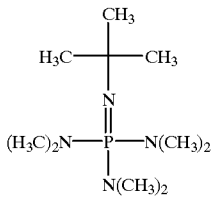

1-(1,1,3,3-tetramethylbutyl)-2,2,2-tris(dimethylamino) phosphazene [chemical formula (6)] (6)

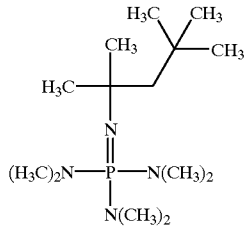

1-ethyl-2,2,4,4,4-pentakis(dimethylamino)-2$\lambda^5$,4$\lambda^5$-catenadi(phosphazene) [chemical formula (7)] (7)

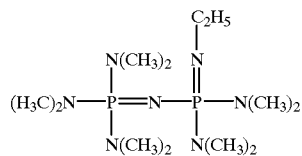

1-tert-butyl-4,4,4-tris(dimethylamino)-2,2-bis[tris-(dimethylamino)phosphoranilideneamino]-2$\lambda^5$,4$\lambda^5$-catenadi(phosphazene) [chemical formula (8)] (8)

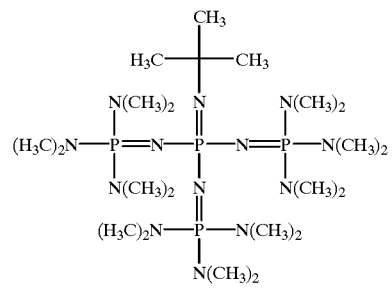

1-(1,1,3,3-tetramethylbutyl)-4,4,4-tris(dimethylamino)-2,2-bis[tris(dimethylamino)phosphoranilideneamino]-2$\lambda^5$,4$\lambda^5$-catenadi(phosphazene) [chemical formula (9)] (9)

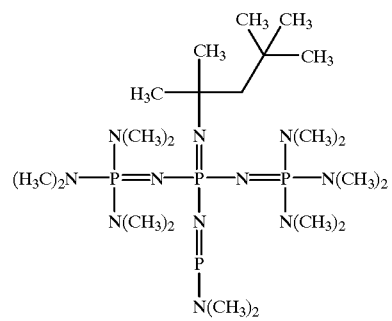

1-tert-butyl-2,2,2-tri(1-pyrrolidinyl)phosphazene [chemical formula (10)] (10)

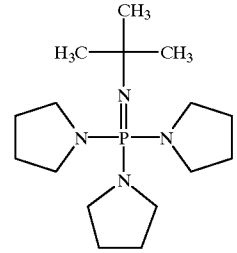

7-ethyl-5,11-dimethyl-1,5,7,11-tetraaza-6$\lambda^5$-phosphaspiro[5.5]undeca-1(6)-ene [chemical formula (11)] (11)

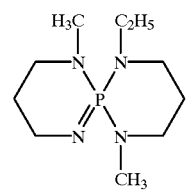

In the process according to the present invention, these phosphazene compounds can be used either singly or in combination.

Although the alkylene oxide compound is polymerized in the presence of the above-mentioned active hydrogen compound and phosphazene compound in the process of this invention, the polymerization is initiated via the phosphazenium salt of the active hydrogen compound, said phosphazenium salt being formed from the active hydrogen compound and the phosphazene compound in the system. It is therefore possible to initiate the polymerization by using the phosphazenium salt of the active hydrogen compound prepared beforehand from the active hydrogen compound and the phosphazene compound. In this case, an active hydrogen compound, which is the same as or different from the salt-forming active hydrogen compound, may exist in the polymerization reaction system. No particular limitation is imposed on the formation of the phosphazenium salt of the active hydrogen compound from the active hydrogen compound and the phosphazene compound. In general, a solution of the phosphazene compound is added to the active hydrogen compound or its solution, followed by a reaction usually in a temperature range of from −50 to 150° C. The reaction mixture can be used for the polymerization reaction either as is or after removing the solvent. In some instances, the reaction product can be used for the polymerization reaction after its separation and purification.

In the process of this invention, two or more alkylene oxide compounds may also be used in combination. When plural alkylene oxide compounds are used and polymerized in combination at the same time, a copolymer of relatively high randomness is obtained although the randomness varies depending on a difference in reactivity between such compounds. When two or more alkylene oxide compounds are successively polymerized, a block copolymer containing blocks of two or more poly(alkylene oxide) compounds is obtained. For example, when a second alkylene oxide compound is successively polymerized subsequent to the completion of a polymerization reaction of a first alkylene oxide compound, a block copolymer containing two kinds of blocks is obtained. Further, an alternating block copolymer can be obtained by polymerizing the first alkylene oxide compound again subsequent to the completion of the polymerization of the second alkylene oxide compound or by repeating such alternate polymerization of the first and second alkylene oxide compounds. If three or more alkylene oxide compounds are used in combination in such a manner as described above, a more complex block copolymer can be obtained. Among these copolymerization processes, it is preferred to obtain a block copolymer, which contains blocks of poly-(propylene oxide) (also called "polyoxypropyleneI") and poly(ethylene oxide) (also called "polyoxyethylene"), by successively polymerizing propylene oxide and ethylene oxide as alkylene oxide compounds.

Although no particular limitation is imposed on the amount of the alkylene oxide compound, the alkylene oxide compound may generally be used in an amount of $2.5 \times 10^5$ moles or less, preferably in a range of from $2 \times 1.0 \times 10^5$ moles, more preferably in a range of from 4 to $5 \times 10^4$ moles per mole of the co-existing active hydrogen compound when the polymerization is conducted in the presence of the active hydrogen compound and the phosphazene compound or per mole of the sum of the active hydrogen compound forming the phosphazenium salt of the active hydrogen compound and any active hydrogen compound, which may exist in the system, when the polymerization is conducted in the presence of the phosphazenium salt of the active hydrogen compound.

No particular limitation is imposed on the amount of the phosphazene compound or the phosphazenium salt of the active hydrogen compound, but it can be used generally in a range of from $1 \times 10^{-15}$ to $5 \times 10^{-1}$ mole, preferably in a range of from $1 \times 10^{-7}$ to $1 \times 10^{-2}$ mole per mole of the alkylene oxide compound.

The polymerization temperature varies depending on the kinds and amounts of the raw material, initiator and catalyst.

It is however generally 150° C. or lower, preferably from 10 to 130° C., more preferably from 50 to 120° C.

The reaction pressure upon polymerization of the alkylene oxide compound is dependent on the kinds and amounts of the raw material, initiator and catalyst and the polymerization temperature, and cannot be defined in a wholesale manner. In general, the pressure at the time of the reaction is 30 kg/cm$^2$ or lower (absolute pressure, this will hereinafter apply equally), with a range of from 0.1 to 10 kg/cm$^2$ being preferred and a range of from 1 to 5 kg/cm$^2$ being more preferred.

The reaction time is dependent on the kinds and amounts of the raw material, initiator and catalyst and the polymerization temperature, and cannot be defined in a wholesale manner. It is however generally 40 hours or less, preferably 30 hours or less, more preferably 0.5 to 24 hours.

The phosphazene compound or the phosphazenium salt catalyst in the process of the present invention can be used in combination with a conventionally-known catalyst with a view to reducing the work load which will be required for the removal of the catalyst subsequent to the polymerization.

In the process of the present invention, no particular limitation is imposed on the method by which the polymerization reaction is carried out. However it is generally practiced to feed the alkylene oxide compound in an amount as much as needed at once, intermittently or continuously to a reactor which contains the active hydrogen compound and the phosphazene compound or the phosphazenium salt of the active hydrogen compound.

In the process of the present invention, a solvent can also be used, as needed, for the dilution or dissolution of the active hydrogen compound and the phosphazene compound or the phosphazenium salt of the active hydrogen compound and the alkylene oxide compound or as a medium for the polymerization reaction. Examples of such a solvent include hydrocarbon compounds such as pentane, hexane, heptane and cyclohexane; aromatic hydrocarbons such as benzene and toluene; and ether compounds such as diethyl ether, dioxane and anisole. Any other solvents can also be used insofar as they do not interfere with the polymerization reaction in the process of the present invention. Further, the polymerization reaction in the process of this invention can also be conducted in the presence of an inert gas such as nitrogen or argon if necessary.

The poly(alkylene oxide) obtained in accordance with the process of the present invention can be used, as is, as a raw material for a polyurethane foam or elastomer or as a surfactant but, if necessary, can also be used after treating it with a mineral acid such as hydrochloric acid, phosphoric acid or sulfuric acid, an organic carboxylic acid such as formic acid, acetic acid or propionic acid, carbon dioxide gas, an acid-form ion-exchange resin, or the like. Further, it can also be subjected to conventional purification such as washing in water, an organic solvent or a mixture thereof.

The present invention will hereinafter be described by the following examples.

EXAMPLE 1

In a 300-ml autoclave connected with a feed pump and a flowmeter, fitted with a temperature measuring tube, a pressure gauge and a stirrer, and purged with dry nitrogen, were charged 254 mmol of glycerin and 0.50 mmol of 1-(1,1,3,3-tetramethylbutyl)-4,4,4-tris-(dimethylamino)-2,2-bis[tris(dimethylamino)phosphoranilideneamino]-2$\lambda^5$, 4$\lambda^5$-catenadi(phosphazene) [chemical formula (9), product of Fulka Corp.; hereinafter referred to as the "catalyst A"]. Propylene oxide was polymerized at a reaction temperature of 100° C. for 17.5 hours while intermittently charging it to maintain a reaction pressure of around 3.0 kg/cm² (absolute pressure; this will hereinafter apply equally). Polyoxypropylenetriol having a hydroxyl number of 358 (KOH mg/g polymer; this will hereinafter apply equally) was obtained in an amount of 119 g. It was in the form of a colorless clear odorless liquid.

EXAMPLE 2

In the same autoclave as that employed in Example 1, were charged 50 mmol of polyoxypropylenetriol (hereinafter abbreviated as the "triol A"), which had been industrially produced in the presence of potassium hydroxide as a catalyst while using glycerin as an initiator and had a hydroxyl number of 337, as an initiator and 0.50 mmol of 1-tert-butyl-4,4,4-tris-(dimethylamino)-2,2-bis[tris (dimethylamino)phosphoranilideneamino]-2$\lambda^5$,4$\lambda^5$-catenadi(phosphazene) [chemical formula (6), product of Fulka Corp.; hereinafter referred to as the "catalyst B"]. Propylene oxide was polymerized at a reaction pressure of around 3.0 kg/cm² and a reaction temperature of 100° C. for 4.8 hours as in Example 1. Polyoxypropylenetriol having a hydroxyl number of 84 was obtained in an amount of 75 g. It was in the form of a colorless clear odorless liquid.

EXAMPLE 3

In the same autoclave as that employed in Example 1, were charged 28.4 mmol of polyoxypropylenetriol (hereinafter abbreviated as the "triol B"), which had been industrially produced in the presence of potassium hydroxide as a catalyst while using glycerin as an initiator and had a hydroxyl number of 168, and 0.50 mmol of the catalyst B. Propylene oxide was polymerized at a reaction pressure of around 3.0 kg/cm² and a reaction temperature of 100° C. for 2.3 hours as in Example 1. Polyoxypropylenetriol having a hydroxyl number of 78 was obtained in an amount of 61 g. It was in the form of a colorless clear odorless liquid. Further, using a PLgel column (5µ, "Mixed-D", trade name; manufactured by Polymer Laboratories Inc.) in combination with a GPC instrument ("Labchart 180II", trade name; manufactured by JIC Corp.), a molecular weight distribution of the polyoxypropylenetriol was measured (eluent: tetrahydrofuran). The molecular weight distribution as calculated based on a calibration curve which used the standard polystyrene was found to be narrow, that is, 1.03 in terms of Mw/Mn [a ratio of a weight average molecular weight (Mw) to a number average molecular weight (Mn)].

EXAMPLE 4

In the same autoclave as that employed in Example 1, were charged 254 mmol of propylene glycol and 0.50 mmol of the catalyst B. Propylene oxide was polymerized at a reaction pressure of around 3.0 kg/cm² and a reaction temperature of 100° C. for 16 hours as in Example 1. Polyoxypropylenetriol having a hydroxyl number of 200 was obtained in an amount of 123 g. It was in the form of a colorless clear odorless liquid.

EXAMPLE 5

In the same autoclave as that employed in Example 1, were charged 167 mmol of glycerin together with 83 mmol of sorbitol and 2.5 mmol of the catalyst A. Propylene oxide was polymerized at a reaction pressure of around 3.0 kg/cm² and a reaction temperature of 120° C for 1.1 hours as in Example 1. Polyoxypropylenetriol having a hydroxyl number of 126 was obtained in an amount of 181 g. It was in the form of a colorless clear odorless liquid.

EXAMPLE 6

The autoclave of Example 1 was additionally fitted with piping to permit feeding of ethylene oxide in a liquid form under pressure from an ethylene oxide tank, which was designed to be maintained under a pressure of 5 kg/cm² with nitrogen, through a flowmeter arranged exclusively for ethylene oxide. The autoclave was charged with 150 mmol of ethylene glycol and 3.0 mmol of 1-ethyl-2,2,4,4,4-pentakis (dimethylamino)-2$\lambda^5$,4$\lambda^5$-catenadi(phosphazene) [chemical formula (5), product of Fulka Corp.; hereinafter referred to as the "catalyst C"] and further with 2.0 kg/cm² of nitrogen. Ethylene oxide was polymerized at a temperature of 80° C. for 2.3 hours while intermittently charging it from the tank to maintain a reaction pressure of around 4.0 kg/cm². Polyoxyethylenediol having a hydroxyl number of 197 was obtained in an amount of 76 g. It was in the form of a white odorless solid.

EXAMPLE 7

In the same autoclave as that employed in Example 1, were charged 125 mmol of ethylene glycol and 2.5 mmol of the catalyst A. 1,2-Butylene oxide was polymerized at a reaction pressure of around 2.0 kg/cm² and a reaction temperature of 100° C. for 2.3 hours as in Example 1. Polyoxybutylenediol having a hydroxyl number of 184 was obtained in an amount of 69 g. It was in the form of a colorless clear odorless liquid.

EXAMPLE 8

In the same autoclave as that employed in Example 1, were charged 125 mmol of ethylene glycol and 2.5 mmol of the catalyst B. Further, 321 mmol of styrene oxide were added at once, followed by polymerization at a reaction temperature of 120° C. and a reaction pressure of around 1.1 kg/cm² for 2.3 hours. Polyoxystyrenediol having a hydroxyl number of 303 was obtained in an amount of 38 g. It was colorless, clear and odorless.

EXAMPLE 9

In the same autoclave as that employed in Example 6, 50 mmol of the triol A and 0.50 mmol of the catalyst B were charged. Propylene oxide and ethylene oxide were polymerized at a reaction temperature of 100° C. for 2.3 hours while continuously feeding them at a molar ratio of 7:3 so that a reaction pressure of around 4.0 kg/cm² was maintained. Polyoxypropylenepolyoxyethylenetriol copolymer having a hydroxyl number of 105 was obtained in an amount of 59 g. It was colorless, clear and odorless.

EXAMPLE 10

In the same autoclave as that employed in Example 6, 254 mmol of trimethylolpropane and 0.50 mmol of the catalyst A were charged, followed by further charging of nitrogen to 2.0 kg/cm². As in Example 6, ethylene oxide was polymerized at a reaction temperature of 80° C. for 2.3 hours while intermittently feeding it to maintain a reaction pressure of around 4.0 kg/cm². Polyoxyethylenetriol having a hydroxyl number of 580 was obtained in an amount of 47 9. It was a white odorless solid.

EXAMPLE 11

In the same autoclave as that employed in Example 1, 100 mmol of N,N'-dimethylethylenediamine and 0.50 mmol of the catalyst A were charged. Propylene oxide was polymerized at a reaction pressure of around 3.0 kg/cm² and a reaction temperature of 100° C. for 2.3 hours as in Example 1. Polyoxypropylenediol having a hydroxyl number of 590 was obtained in an amount of 69 g. It was in the form of a colorless clear odorless liquid.

EXAMPLE 12

In the same autoclave as that employed in Example 1, 502 mmol of pentaerythritol and 1 mmol of the catalyst A were charged. Propylene oxide was polymerized at a reaction pressure of around 3.0 kg/cm² and a reaction temperature of 100° C. for 8.0 hours as in Example 1. Polyoxypropylenetetraol having a hydroxyl number of 662 was obtained in an amount of 69 g. It was in the form of a colorless clear odorless liquid.

EXAMPLE 13

In the same autoclave as that employed in Example 1, 50 mmol of the polyoxypropylenetriol obtained in Example 1 and 0.42 mmol of the catalyst A were charged. Propylene oxide was polymerized at a reaction pressure of around 3.0 kg/cm² and a reaction temperature of 100° C. for 4.8 hours as in Example 1. Polyoxypropylenetriol having a hydroxyl number of 78 was obtained in an amount of 84 g. It was in the form of a colorless clear odorless liquid.

EXAMPLE 14

In the same autoclave as that employed in Example 6, 20 mmol of 2-naphthol, 10 ml of toluene and 2.0 mmol of 1-tert-butyl-2,2,2-tris(dimethylamino)-phosphazene [chemical formula (3), product of Fulka Corp.; hereinafter abbreviated as the "catalyst D"], followed by further charging of nitrogen to 2 kg/cm². As in Example 6, ethylene oxide was polymerized at a reaction temperature of 80° C. for 24 hours while intermittently feeding it to maintain a reaction pressure of around 4.0 kg/cm². Polyoxyethylenemonool having a hydroxyl number of 5.8 was obtained in an amount of 192 g. It was a white odorless solid.

Comparative Example 1

In the same autoclave as that employed in Example 1, 1 mole of glycerin and a (10 wt. %) solution of 2 mmol of tetramethylammonium hydroxide in methanol were charged. While heating the contents at 110° C. under stirring, the methanol was removed under reduced pressure. Propylene oxide was polymerized at a reaction pressure of around 3.0 kg/cm² and a reaction temperature of 100° C. for 36 hours as in Example 1. After that, the contents were heated at 150° C. for 5 hours while eliminating volatiles under reduced pressure. The thus-obtained polyoxypropylenetriol still had a substantial amine odor. Its hydroxyl number was 1100, and its yield was 153 g.

Comparative Example 2

In the same autoclave as that employed in Example 1, 106 mmol of the triol B employed in Example 3 and a (10 wt. %) solution of 1.9 mmol of tetramethylammonium hydroxide in methanol were charged. While heating the contents at 110° C. under stirring, the methanol was removed under reduced pressure. Propylene oxide was polymerized at a reaction pressure of around 3.0 kg/cm² and a reaction temperature of 100° C. for 9 hours as in Example 1. After that, the contents were heated at 150° C. for 5 hours while eliminating volatiles under reduced pressure. The thus-obtained poly-oxypropylenetriol had an amine odor. Its hydroxyl number was 110, and its yield was 56 g.

Comparative Example 3

In the same autoclave as that employed in Example 6, 425 mmol of trimethylolpropane and 1.8 mmol of 2,4,6-tris (dimethylaminomethyl)phenol (hereinafter abbreviated as "DMP-30") were charged, followed by further charging of nitrogen to 2 kg/cm². As in Example 6, ethylene oxide was polymerized at a reaction temperature of 80° C. for 12 hours while intermittently feeding it to maintain a reaction pressure of around 4.0 kg/cm². The contents were then cooled to 90° C., followed by the addition of a solution of 4 mg of 2,6-di-tert-butyl-p-cresol in 10 ml of methanol. After that, volatiles were eliminated under reduced pressure. The thus-obtained polyoxyethylenetriol had an amine odor. Its hydroxyl number was 647, and its yield was 67 g.

Polymerization activities of the catalysts in Examples 1 to 14 and Comparative Examples 1 to 3 are summarized in Table 1.

TABLE 1

| Example No. | Catalyst | Initiator | Polymerization activities (g/mol-catalyst.Hr) |
|---|---|---|---|
| Ex. 1 | A | Glycerin | 13,600 |
| Ex. 2 | B | Triol A | 31,000 |
| Ex. 3 | B | Triol B | 53,000 |
| Ex. 4 | B | Propylene glycol | 15,400 |
| Ex. 5 | A | Glycerin + Sorbitol | 66,000 |
| Ex. 6 | C | Ethylene glycol | 11,000 |
| Ex. 7 | A | Ethylene glycol | 12,000 |
| Ex. 8 | B | Ethylene Glycol | 6,700 |
| Ex. 9 | B | Triol A | 51,000 |
| Ex. 10 | A | Trimethylolpropane | 41,300 |
| Ex. 11 | A | N,N-dimethyl-ethylenediamine | 27,500 |
| Ex. 12 | A | Pentaerythritol | 12,700 |
| Ex. 13 | A | Triol obtained in Example 1 | 35,000 |
| Ex. 14 | D | 2-Naphthol | 4,000 |
| Comp. Ex. 1 | (CH₃)₄N.OH | Glycerin | 850 |
| Comp. Ex. 2 | (CH₃)₄N.OH | Triol B | 3,300 |
| Comp. Ex. 3 | DMP-30 | Trimethylolpropane | 3,100 |

EXAMPLE 15

In a polymerization reactor similar to the autoclave in Example 6, 254 mmol of glycerin and 0.50 mmol of the catalyst A were charged. 100 g of propylene oxide was polymerized at a reaction temperature of 100° C. for 20 hours while intermittently feeding it to maintain the reaction pressure around 3.0 kg/cm². After the reaction system was maintained at 10 mmHg for 30 minutes, the pressure of the reaction system was allowed to rise back to normal pressure with dry nitrogen. 80 g of ethylene oxide was then polymerized at a reaction temperature of 100° C. for 15 hours while intermittently feeding it to maintain a reaction pressure of approximately 4.0 kg/cm². After the reaction system was maintained at 10 mmHg for 30 minutes, the pressure of the reaction system was allowed to rise back to normal pressure with dry nitrogen. A block copolymer was obtained as a colorless clear odorless liquid in an amount of 192 g. Its hydroxyl number was 221. This block copolymer was polyoxypropylene-polyoxyethylenetriol which contained poly(propylene oxide) blocks and poly(ethylene oxide)

blocks. The molar ratio of the monomer units in the respective blocks is about 1:1.

EXAMPLE 16

In a polymerization reactor similar to the autoclave in Example 1, 96 g of the catalyst-containing polyoxypropylenepolyoxyethylenetriol obtained in Example 15 were charged. While intermittently feeding 49 g of propylene oxide again to the reactor to maintain the reaction pressure around 3.0 kg/cm$^2$, it was polymerized at a reaction temperature of 110° C. for 20 hours. After the reaction system was maintained at 10 mmHg for 30 minutes, the pressure of the reaction system was allowed to rise back to normal pressure with dry nitrogen and the contents were allowed to cooled down to room temperature. A block copolymer was obtained as a colorless clear odorless liquid in an amount of 144 g. Its hydroxyl number was 147. This block copolymer was polyoxypropylenepolyoxyethylenepolyoxypropylenetriol which contained poly(propylene oxide) blocks, poly(ethylene oxide) blocks and polypropylene oxide blocks. The molar ratio of the monomer units in respective blocks is 1:1:1 in this order.

EXAMPLE 17

By reacting the catalyst A and methanol, 1,1,3,3-tetramethylbutylaminotris[tris(dimethylamino)phosphoranilideneamino]phosphonium methoxide (hereinafter called the "catalyst E") was synthesized as a phosphazenium salt.

In a 300-ml of an eggplant type flask fitted with a reflux condenser, 10 mmol of the above-synthesized phosphazenium salt, 50 ml of toluene and 116 g of propylene oxide were charged. The propylene oxide was polymerized for 20 hours while maintaining the reaction temperature within a range of from 35 to 40° C. The contents were washed twice with 50 ml portions of 1 N HCl solution, and the toluene layer was concentrated to dryness. Polyoxypropylenemonool having a hydroxyl number of 5.4 was obtained in an amount of 112 g. It was a colorless clear odorless liquid.

EXAMPLE 18

By reacting the catalyst B and phenol, tertbutylaminotris[tris(dimethylamino)phosphoranilideneamino]phosphonium phenoxide was synthesized as a phosphazenium salt.

In a 300-ml of an eggplant type flask fitted with a reflux condenser, 10 mmol of the above-synthesized phosphazenium salt, 50 ml of toluene and 116 g of propylene oxide were charged. The propylene oxide was polymerized for 20 hours while maintaining the reaction temperature within a range of from 35 to 40° C. The contents were subjected to similar post treatment as in Example 17. Polyoxypropylenemonool having a hydroxyl number of 5.6 was obtained in an amount of 108 g. It was a colorless clear odorless liquid.

EXAMPLE 19

In the same autoclave as that employed in Example 1, 254 mmol of methanol and 0.50 mmol of the catalyst E were charged. Propylene oxide was polymerized at a reaction pressure of around 3.0 kg/cm$^2$ and a reaction temperature of 100° C. for 16 hours as in Example 1. Polyoxypropylenemonool having a hydroxyl number of 170 was obtained in an amount of 85 g. It was in the form of a colorless clear odorless liquid.

EXAMPLE 20

By reacting the catalyst A and water, 1,1,3,3,-tetramethylbutylaminotris[(tris(dimethylamino)phosphoranilideneamino]phosphonium hydroxide (hereinafter called the "catalyst F") was synthesized as a phosphazenium salt.

In the same autoclave as that employed in Example 1, 254 mmol of glycerin and 0.50 mmol of the above-synthesized phosphazenium salt were charged. Propylene oxide was polymerized at a reaction pressure of around 3.0 kg/cm$^2$ and a reaction temperature of 100° C. for 19 hours as in Example 1. Polyoxypropylenetriol having a hydroxyl number of 342 was obtained in an amount of 125 g. It was in the form of a colorless clear odorless liquid.

EXAMPLE 21

By reacting 1-tert-butyl-2,4,4,4-tetra-(pyrrolidin-1-yl)-2-tri(pyrrolidin-1-yl)phosphoranilideneamino-2$\lambda^5$,4$\lambda^5$-catenadi(phosphazene) and acetic acid, tert-butylaminopyrrolidin-1-ylbis[tri(pyrrolidin-1-yl)phosphoranilideneamino]phosphonium acetate was synthesized as a phosphazenium salt.

In the same autoclave as that employed in Example 1, 254 mmol of glycerin and 5.10 mmol of the above phosphazenium salt were charged. Propylene oxide was polymerized at a reaction pressure of around 3.0 kg/cm$^2$ and a reaction temperature of 110° C. for 17 hours as in Example 1. Polyoxypropylenetriol having a hydroxyl number of 464 was obtained in an amount of 95 g. It was in the form of a colorless clear odorless liquid.

EXAMPLE 22

In a polymerization reactor similar to the autoclave in Example 6, 254 mmol of glycerin and 3.05 mmol of the catalyst F were charged. While intermittently feeding 100 g of propylene oxide to maintain the reaction pressure around 3.0 kg/cm$^2$, it was polymerized at a reaction temperature of 80° C. for 12 hours. After the reaction system was maintained at 10 mmHg for 30 minutes, the pressure of the reaction system was allowed to rise back to normal pressure with dry nitrogen. While intermittently feeding 80 g of ethylene oxide again to the reactor to maintain the reaction pressure around 4.0 kg/cm$^2$, it was polymerized at a reaction temperature of 100° C. for 15 hours. After the reaction system was maintained at 10 mmHg for 30 minutes, the pressure of the reaction system was allowed to rise back to normal pressure with dry nitrogen and the contents were allowed to cool down to room temperature. A block copolymer was obtained as a colorless clear odorless liquid in an amount of 103 g. Its hydroxyl number was 213. This block copolymer was polyoxypropylenepolyoxyethylenetriol which contained poly(propylene oxide) blocks and poly(ethylene oxide) blocks. The molar ratio of the monomer units in the respective blocks is about 1:1.

EXAMPLE 23

In a polymerization reactor similar to the autoclave in Example 1, 101 g of the catalyst-containing polyoxypropylenepolyoxyethylenetriol obtained in Example 22 were charged. While intermittently feeding 50 g of propylene oxide again to the reactor to maintain the reaction pressure around 3.0 kg/cm$^2$, it was polymerized at a reaction temperature of 80° C. for 12 hours. After the reaction system was maintained at 10 mmHg for 30 minutes, the pressure of the reaction system was allowed to rise back to normal pressure with dry nitrogen and the contents were allowed to cooled down to room temperature. A block copolymer was obtained as a colorless clear odorless liquid in an amount of 150 g. Its hydroxyl number was 145. This block copolymer was polyoxypropylenepolyoxyethylenepolyoxypropylenetriol which contained poly(propylene oxide) blocks, poly(ethylene oxide) blocks and polypropylene oxide blocks. The molar ratio of the monomer units in the respective blocks is about 1:1:1 in this order.

By the present invention, a polyalkylene oxide can be efficiently produced by polymerizing an alkylene oxide compound in the presence of an active hydrogen compound and a phosphazene compound or in the presence of a phosphazenium salt of the active hydrogen compound derived from the active hydrogen compound and the phosphazene compound. Further, the thus-obtained polymer has the excellent features that it is free of any metal component and has been significantly improved in odor over polymers obtained using the conventional amine-base catalysts.

What is claimed is:

1. A process for the production of a block copolymer which contains poly(propylene oxide) and poly(ethylene oxide) blocks, said process comprising successively polymerizing propylene oxide and ethylene oxide in the presence of (A) an active hydrogen compound selected from the group consisting of (i) polyhydric alcohols having 2 to 10 hydroxyl groups and 2 to 20 carbon atoms, (ii) saccharides or derivatives thereof, and (iii) oligo(alkylene oxide)s or poly(alkylene oxide)s obtained by polymerizing alkylene oxides and said active hydrogen compound and (B) a phosphazene compound selected from the group consisting of (i) 1-tert-butyl-2,2,2-tris(dimethylamino) phosphazene, (ii) 1-(1,1,3,3-tetramethylbutyl)-2,2,2-tris(dimethylamino)phosphazene, (iii) 1-ethyl-2,2,4,4, 4-pentakis(dimethylamino)-$2\lambda^5,4\lambda^5$-catenadi(phosphazene), (iv) 1-tert-butyl-4,4,4-tris(dimethylamino)-2,2-bis[tris(dimethyl-amino) phosphoranilideneamino]-$2\lambda^5,4\lambda^5$-catenadi(phosphazene), (v) 1-(1,1,3,3-tetramethylbutyl)-4,4,4-tris (dimethylamino)-2,2-bis[tris(dimethylamino) phosphoranilideneaminol]-$2\lambda^5,4\lambda^5$-catenadi(phosphazene), (vi) 1-tert-butyl-2,2,2-tri(1-pyrrolidinyl)phosphazene, and (vii) 7-ethyl-5,11-dimethyl-1,5,7,11-tetraaza-$6\lambda^5$-phosphaspiro[5.5]undeca-1(6)-ene, or in the presence of a phosphazenium salt of said active hydrogen compound, said phosphazenium salt having been derived from said active hydrogen compound and said phosphazene compound, wherein said phosphazene compound or said phosphazenium salt of said active hydrogen compound is in a range of from $1.0\times10^{-7}$ to $1.0\times10^{-2}$ mole per mole of the sum of propylene oxide and ethylene oxide, and said sum of propylene oxide and ethylene oxide being in a range of from 2 to $1.0\times10^5$ moles per mole of said coexisting active hydrogen compound when the polymerization is conducted in the presence of said active hydrogen compound and said phosphazene compound or per mole of the sum of said active hydrogen compound forming said phosphazenium salt of said active hydrogen compound and any of said active hydrogen compound which exists in the system, when the polymerization is conducted in the presence of said phosphazenium salt of said active hydrogen compound.

* * * * *

UNITED STATES PATENT AND TRADEMARK OFFICE
CERTIFICATE OF CORRECTION

PATENT NO. : 6,022,945  
DATED : February 8, 2000  
INVENTOR(S) : Mashiro Kouno et al.

It is certified that error appears in the above-identified patent and that said Letters Patent is hereby corrected as shown below:

<u>Title page,</u>
Item [30], change "6-048985" to -- 8-048985 --;
change "6-128664" to -- 8-128664 --.

Signed and Sealed this

Twenty-fifth Day of September, 2001

Attest:

*Attesting Officer*

NICHOLAS P. GODICI
*Acting Director of the United States Patent and Trademark Office*